United States Patent [19]

Blass et al.

[11] 3,956,271

[45] May 11, 1976

[54] PROCESS FOR THE PRODUCTION OF CONCENTRATED SOLUTIONS OF CATIONIC AZO DYES

[75] Inventors: Ulrich Blass, Reinach; Roland Entschel, Basel, both of Switzerland

[73] Assignee: Sandoz Ltd., Basel, Switzerland

[22] Filed: Feb. 6, 1974

[21] Appl. No.: 439,913

Related U.S. Application Data

[63] Continuation-in-part of Ser. No. 2,347, Jan. 12, 1970, abandoned, and a continuation-in-part of Ser. No. 2,348, Jan. 12, 1970, abandoned.

[30] Foreign Application Priority Data

Jan. 20, 1969 Switzerland............................ 735/69
Apr. 8, 1969 Switzerland.......................... 5257/69
July 30, 1969 Switzerland....................... 11592/69

[52] U.S. Cl................................ 260/208; 260/156; 260/205; 8/41 R; 8/79; 8/92
[51] Int. Cl.² ........................................ C09B 43/00
[58] Field of Search ........... 260/205, 208, 149, 156, 260/501.15, 567.6 R, 567.6 M, 567.6 P, 286 Q, 245; 8/177 AB

[56] References Cited
UNITED STATES PATENTS

| | | | |
|---|---|---|---|
| 2,087,506 | 7/1937 | DeGroote | 260/567.6 M |
| 2,641,610 | 6/1953 | Barber | 260/567.6 P |
| 2,645,593 | 7/1953 | Erskine | 260/567.6 M |
| 2,692,285 | 10/1954 | Robinson | 260/567.6 M |
| 3,341,572 | 9/1967 | Engelhard et al. | 260/570.7 X |
| 3,346,322 | 10/1967 | Finkenauer et al. | 8/79 |
| 3,374,221 | 3/1968 | Entschel et al. | 260/205 |
| 3,459,728 | 8/1969 | Entschel et al. | 260/205 X |
| 3,518,244 | 6/1970 | Mundlos et al. | 260/149 |
| 3,560,507 | 2/1971 | Wakeman et al. | 260/567.6 M |
| 3,578,667 | 5/1971 | Wakeman et al. | 260/567.6 M |
| 3,580,900 | 5/1971 | Mundlos et al. | 260/149 |

FOREIGN PATENTS OR APPLICATIONS

| | | | |
|---|---|---|---|
| 752,681 | 7/1956 | United Kingdom | 260/567.6 P |
| 1,088,611 | 10/1967 | United Kingdom | 260/205 |
| 473,204 | 7/1969 | Switzerland | 260/205 |
| 1,193,345 | 5/1970 | United Kingdom | 260/162 |
| 1,240,036 | 5/1967 | Germany | 260/208 |
| 1,109,291 | 6/1961 | Germany | |

OTHER PUBLICATIONS

Sisler et al., *General Chemistry*, The Macmillian Company; New York, 1949, pp. 353–356.

*Primary Examiner*—Charles F. Warren
*Attorney, Agent, or Firm*—Gerald D. Sharkin; Richard E. Vila; Melvyn M. Kassenoff

[57] ABSTRACT

Concentrated solutions of cationic azo dyes are prepared directly from sparingly soluble salts of the dye in a one-step reaction by reacting the sparingly soluble dye with a non-chromophoric carboxylate salt, the cation of which forms an insoluble or sparingly soluble salt with the anion of the starting cationic azo dye in the solvent system employed.

25 Claims, No Drawings

PROCESS FOR THE PRODUCTION OF CONCENTRATED SOLUTIONS OF CATIONIC AZO DYES

This application is a continuation-in-part of application Ser. No. 2,347, filed on Jan. 12, 1970, and now abandoned and application Ser. No. 2,348, filed on Jan. 12, 1970 and now abandoned.

The solubility, in particular the solubility in water, of basic dyes and especially of catonic dyes has for years engaged the manufacturers of these dyes as well as dyeing specialists. Many proposals for solution of this problem have been proposed but no generally valid solution has been found. Most attempts were directed towards discovering by laborious, costly and protracted trail and error experimentation, a solvent or solvent mixture in which the cationic dye was sufficiently soluble for preparation of a concentrated solution.

The literature and in particular the patent literature based on this is very abundant. For example, U.S. Pat. Nos. 3,518,244 and 3,580,900 describe the preparation of solutions of cationic monoazo dyes as, for example, zinc chloride double salts. For example, in one case 5 gr. of a cationic monoazo dye was stirred with 15 ml. of a 50% aqueous acetic acid solution and subsequently dissolved in 300 ml. of hot water. In the second case 2 grams of a cationic dye was stirred with 2.5 grams of a 50% aqueous acetic acid solution and subsequently dissolved in 6 liters of water. Anyone skilled in the art knows that the stirring of the previously mentioned amounts of dye in a little acetic acid does not result in complete dissolution; a suspension or dispersion rather than a true solution is obtained. Subsequent to this stirring the dyebath is prepared by addition of water to the suspension; the suspension and, hence, the dye then dissolves. However, what is obtained is a dilute dyebath rather than a concentrated solution. Moreover, the procedure does not involve a double or metathetic reaction. The afore-described process is conveniently used by dye-houses for the preparation of dye baths.

Also, German Pat. Nos. 83,060, 95,828, 101,273, 339,690, 340,552 and 391,007 and British Pat. Nos. 934,356 describe solutions of cationic dyes which are obtained by the trial and error method, i.e., by trying various solvent systems.

In these experiments, it was often necessary to resort to industrially unpleasant methods because certain cationic dyes with excellent properties would dissolve only in solvents that are toxic and/or have an unpleasant odor or in a solvent mixture that contained such a solvent, e.g., a nitrile. Moreover, the presence of such solvents during dyeing was often troublesome.

With the constant development and mechanization of dyeing methods employing basic dyes, the liquid preparations thus prepared were no longer adequate. The dye-houses required concentrated solutions of basic dyes in order to optimally rationalize the dyeing process. Solutions of basic dyes having a concentration of less than 10% were no longer adequate. Moreover, the available range of dyes was no longer sufficient. It was generally acknowledged that attempts to produce concentrated solutions of cationic dyes by the "trial and error" method were not longer acceptable.

Fortunately, however, it was found that the solubility of cationic dyes and the preparation of concentrated solutions thereof is dependent upon the nature of the anion. In this connection, much work became known. Thus, Belgian Pat. No. 701,700, German Pat. No. 1,469,730 and DAS (German Auslegeschrift) No. 1,240,036 disclose that organic anions yield cationic dyes of particularly good solubility. These patents disclose that the exchange of the anions of basic dyes is possible either via a base, e.g., the hydroxide or the bicarbonate. These exchange reactions, however, are complicated, very costly and time-consuming.

A particular disadvantage of these processes is that they involve two discrete steps. A useful, directly employable concentrated solution is obtained only when the intermediate product is isolated before the solution step. Also, very often the solutions obtained must be concentrated by evaporation which also takes appreciable time and is very costly. Such a two-step process is described, for example, in U.S. Pat. No. 3,346,322 and, in particular, in Example 14 thereof. In this example a two-step preparation of a solution of an azomethine dye is described. First, the base is dissolved in water and precipitated out of solution by treatment with alkali, i.e., it is isolated as a solid. Subsequently, the thus isolated solid is dissolved at room temperature in a mixture consisting of glacial acetic acid and diethylene glycol.

Another method which, however, is only useful for a small class of basic dyes, namely the diphenylmethane dyes, is disclosed in German Pat. No. 1,109,291. In this process, a dye of the auramine series having a good solubility in alcohol and alcohol-water mixtures is obtained by double reaction of a mineral acid dye and an alkali metal sulfonate. This process, however, is restricted in that it cannot be used to prepare the acetate of the diphenylmethane dye auramine. Moreover, it is known (Belgian Patent 731,944) that aryl sulfonates of cationic dyes are, in general, unsuitable for the production of liquid preparations because they are only sparingly soluble. A process that does not enable one to prepare a concentrated solution of the acetate salt of this dye and of other cationic dyes is unsatisfactory from an industrial point of view because acetate salts usually have good solubility and are particularly suitable because of their economy.

With the above-noted exceptions, the double reaction process has until now been used in the dye field only for the isolation of certain coloring agents from solution. See, for example, Belgian Pat. No. 714,635. In contrast thereto, the process of this application involves the preparation of concentrated solutions of dyes. In view of the above, it was extremely surprising that carboxylate salts could be used in double exchange reactions to prepare concentrated solutions of carboxylate salts of cationic azo dyes directly from sparingly soluble salt forms of these dyes.

In most cases, the cationic dye is, as is known, obtained as a sulfate, chloride or a zinc chloride double salt or, since the final step of the synthesis is often quaternization with dimethyl sulfate, as a methylsulfate. The sulfates are, as is known, not very soluble in water. There thus existed a genuine need to develop a simple and generally applicable process for the preparation of concentrated ready-to-use (for dyeing) solutions of cationic dyes.

The desire of the dye-houses for concentrated solutions resulted from automation of the dyeing processes and the desire for more rapid and continuous dyeing. The manufacturers of dyes were compelled to supply the dye-houses with dyes that are in a form that is suitable for direct application, i.e., that need not be dissolved, because the dye-houses were no longer willing to use powdered dyes which require a time-consuming weighing and which are often detrimental to health. They prefer to use solutions that are supplied in a ready-to-use form or solutions that need only be diluted prior to use. Obviously, this would be impossible unless cationic dyes of all colors were available as concentrated solutions.

The invention of this application enables one to obtain concentrated solutions of cationic azo dyes in a one-step reaction from salts of the cationic azo dyes that are at best sparingly soluble. That this can be done is quite surprising since the chromophoric cation of cationic azo dyes has an effect on the solubility of the dye in solvents such as water. That the processes of this invention can be used to prepare acetate salts of cationic azo dyes is particularly surprising in view of the afore-mentioned German Pat. No. 1,109,291. The double exchange reaction of this invention results in the conversion of sparingly soluble salts of cationic azo dyes into the corresponding more soluble carboxylate salts, e.g., the acetate salts.

The process of this application represents a significant advance over the previously known processes for the preparation of ready-to-use solutions of cationic azo dyes in that it is a one-step process. The double decomposition process of this invention enables one to easily produce concentrated solutions of cationic azo dyes which solutions can be used directly and with ease for dyeing textiles such as polyacrylonitrile.

The essence of the process of this invention is that an insoluble or at mostly sparingly soluble (in the chosen solvent system) cationic azo dye is converted by a one-step reaction to a solution of a much more soluble salt form.

This invention is directed to a process for the preparation of a concentrated solution of a cationic azo dye, said concentrated solution being suitable for direct application to textiles, wherein (a) an insoluble or at most sparingly soluble cationic azo dye of the formula

$$F^+ A_1^- \qquad (I)$$

is reacted in a solvent system with a non-chromophoric carboxylate salt of the formula

$$M^+ A^- \qquad (II)$$

to obtain a concentrated solution of a soluble cationic azo dye of the formula

$$F^+ A^- \qquad (III),$$

and (b) any precipitated salts are removed, e.g., by filtration or centrifugation, with the provisos that
1. the reactants and solvent system are chosen such that $F^+ A^-$ is more soluble in the solvent system than is $F^+ A_1^-$,
2. $F^+ A^-$ is soluble enough to form a concentrated solution in the chosen solvent system,
3. $M^+ A^-$ are employed in amounts sufficient for the preparation of a concentrated solution, and
4. $M^+ A^-$ is soluble for partially soluble in the solvent system.

In carrying out the reaction, the insoluble or sparingly soluble cationic azo dye of the formula $F^+ A_1^-$ is suspended in the solvent system with a small quantity of the dye dissolving therein. The remainder of the dye may dissolve in the solvent system upon heating (e.g., to 80°–90°C.) or may dissolve only as the reaction proceeds to completion.

Less than one equivalent (relative to the amount of cationic azo dye of the formula $F^+ A_1^-$) of the carboxylate salt of the formula $M^+ A^-$ can be employed. However, it is preferable to use at least one equivalent.

In the foregoing formulae,
$F^+$ is the cation of an insoluble or sparingly soluble cationic azo, preferably monoazo, dye,
$A_1^-$ is the anion of an insoluble or sparingly soluble cationic azo dye,
$M^+$ is a non-chromophoric cation, and
$A^-$ is a non-chromophoric carboxylate anion.

Examples of $A_1^-$ include the chloride, sulfate, methylsulfate, phosphate and perchlorate anions, and mixtures thereof, the chloride and sulfate anions, and mixtures thereof, being preferred and the sulfate anion being particularly preferred.

Examples of $M^+$ include the ammonium, alkali metal (e.g., sodium and potassium), alkaline earth metal (e.g., barium and calcium), zinc and lead cations, and mixtures thereof.

Examples of $A^-$ include the formate, acetate, chloroacetate, propionate, benzoate, phenoxyacetate, maleate, succinate, lactate and tartarate anions, with the acetate anion being particularly preferred, and mixtures thereof.

Examples of $M^+ A^-$ include sodium acetate, lead acetate, ammonium acetate and barium acetate and mixtures thereof. e.g., sodium acetate and lead acetate. Other examples include the barium and lead salts of formic acid, acetic acid, chloroacetic acid, propionic acid, benzoic acid, phenoxyacetic acid, maleic acid, succinic acid, lactic acid and tartaric acid.

The carboxylate salts of the formula $M^+ A^-$ are usually added to the reaction medium (solvent system). However, they may be formed in situ. For example, ammonium acetate is formed in acetic acid from ammonium bicarbonate, barium acetate is formed in acetic acid from barium carbonate, and lead acetate is formed in acetic acid from lead monoxide.

When two or more carboxylate salts of the formula $M^+ A^-$ are employed, e.g., sodium acetate and lead acetate, they may be used together as a mixture as indicated above or they may be added to the reaction medium successively.

The solvent system can be (A1) water, (A2) a mixture of water and one or more organic solvents, (B1) an organic solvent or (B2) a mixture of organic solvents.

Among the organic solvents that may be employed in the process of this application when the solvent system is A2, B1 or B2 are mono-, di- and tri-hydroxy alcohols such as benzyl alcohol, cyclohexanol, glycol (ethylene glycol), ethyl glycol ($C_2H_5$—O—$CH_2CH_2$—OH), diethylene glycol (HO—$CH_2CH_2$—O—$CH_2CH_2OH$) and glycerol, ketones such as methyl ethyl ketone, ethers such as tripropylene glycol methyl ether, glycol ether, tetrahydrofuran and dioxane, amides such as acetamide, dimethylformamide and N-methylpyrrolidone, lactones such as butyrolactone, nitriles such as acetonitrile and hydroxypropionitrile and caprolactam, pyridine, dimethyl sulfoxide, propanesulfone, sulfolane, ethylenechlorohydrin, propylenechlorohydrin, caprylic acid and, most preferably, glacial acetic acid (or, for solvent system A2, regular commercial acetic acid).

The concentrated solutions produced by the process of this invention advantageously have a dye concentration of at least 10%, e.g., 15–50%, preferably 20–40%.

The cation F⊕ of the monoazo dyes that are preferred for the process of this invention are free of sulfo groups and preferably contain a cationic ammonium, hydrazinium or a cycloimmonium group. Advantageously, the nitrogen atom bearing the positive charge is attached to the diazo or coupling component radical through a bridge member.

Especially good cationic dyes are those of the partial formulae:

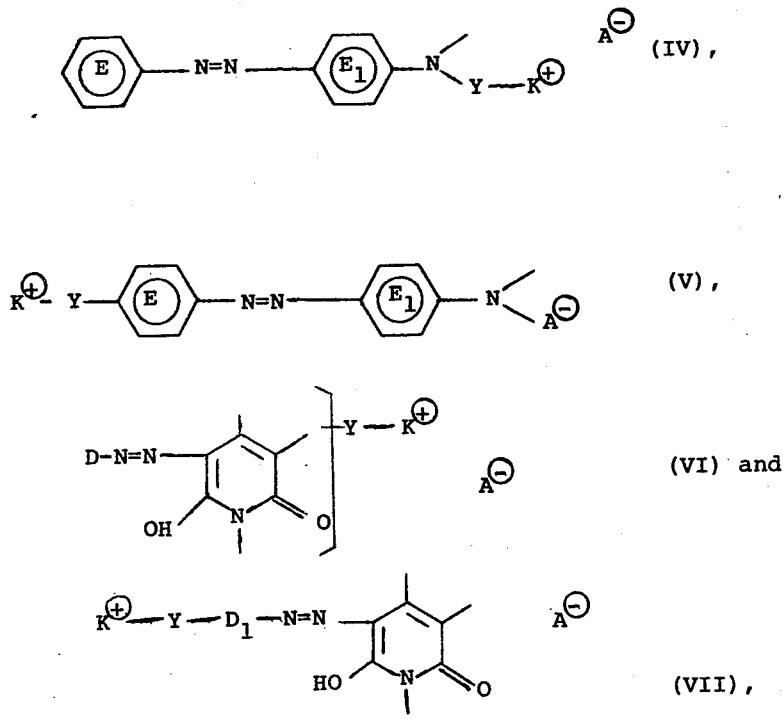

wherein

D is a diazo component radical free of cationic groups, $D_1$ is a diazo component radical free of cationic groups other than the indicated $K^⊕$—Y— group, $K^+$ is a cationic ammonium, hydrazinium or cycloammonium group, Y is a bridge member, and $A^-$ is an anion.

In Formulae IV and V, Rings E and $E_1$ may bear non-water solubilizing substituents. The dyes of Formula VII bear no cationic groups other than the indicated $K^+$—Y— group.

Cationic dyes of Formulae VI and VII are disclosed in U.S. application Ser. No. 400,527, filed on Sept. 25, 1973 as a continuation-in-part of application Ser. No. 824,298, filed on May 13, 1969, and now abandoned. The dyes of Claims 1–21 of Ser. No. 400,527, which are hereby incorporated by reference, are particularly suitable.

Variant A

In process variant A the solvent system is water (subvariant A1) or a mixture of water and one or more organic solvents (subvariant A2). If the solvent system is a mixture of water and one or more organic solvents (subvariant A2), at least 10% (by weight) of the solvent system should be water. Preferably, however, 30–80% (by weight) of the solvent system is water, the remaining 20–70% being an organic solvent or a mixture thereof. The preferred solvent systems are water and a mixture of water and acetic acid, most preferably the latter.

The reaction temperature may range from room temperature to the boiling point of the solvent system and is not critical. Thus, if the reaction is run in water, the reaction temperature may range from about 20°C. to 100°C. Likewise, the temperature may range from about 20° to about 100°C. if the reaction is run in a mixture of acetic acid and water.

$A_1^-$ is preferably chloride, sulfate, methylsulfate, phosphate or perchlorate.

$M^-$ is preferably a barium, lead, calcium or zinc cation, or a mixture thereof, and most preferably is a barium or lead cation, or a mixture thereof, particularly where the starting cationic azo dye of the formula $F^+$ $A^-$ is a sulfate (i.e., $A^-$ is $SO_4^=$). Since barium sulfate and lead sulfate are virtually insoluble in water and mixture of water and one or more organic solvents, the exchange reaction of the process of this application is driven to completion by precipitation of the barium and/or lead sulfate.

Examples of the carboxylate salts of the formula $M^+$ $A^-$ that are preferred for process variant A are the barium and lead salts of formic, acetic, chloroacetic, propionic, benzoic, phenoxyacetic, maleic, succinic, lactic and tartaric acids, especially barium acetate and lead acetate. As previouly indicated, barium acetate can be formed in situ if the solvent system contains acetic acid by the reaction of barium carbonate with acetic acid, and lead acetate can be formed in situ if the solvent system contains acetic acid by the reaction of lead monoxide with acetic acid. A mixture of salts, e.g., barium acetate and lead acetate, can also be employed. Two or more salts, e.g., the foregoing two salts, can be added to the reaction mixture singly in succession.

When the solvent system is a mixture of water and acetic aacid (optionally containing one or more additional organic solvents excluding, however, other carboxylic acids), the carboxylate salt of the formula $M^+ A^-$ is almost always an acetate salt.

The preferred way to carry out process variant A is to use a mixture of water and acetic acid (at least 10% by weight of the mixture, preferably 30–80% by weight, being water), an acetate salt of the formula $M^+ A^-$ ($A^-$ being acetate) and an insoluble or sparingly soluble cationic azo, preferably monoazo, dye of the formula $F^+ A_1^-$ wherein $A_1^-$ is chloride or sulfate.

Variant B

In process variant B the solvent system is an organic solvent (subvariant B1) or a mixture of organic solvents (subvariant B2), the most preferred solvent being glacial acetic acid. Other preferred organic solvents are alcohols such as benzyl alcohol, glycol and ethyl glycol, ketones such as methyl ethyl ketone, formamides such as dimethyl-formamide, tetrahydrofuran, dimethyl sulfoxide, sulfolane and propanesulfone, and mixtures thereof, especially mixtures of the solvents with glacial acetic acid.

The reaction temperature may range from room temperature to the boiling point of the solvent system employed and is not critical. Thus, if the reaction is run in glacial acetic acid, the reaction temperatures may range from about 20°C. to 118°C.

$A_1^-$ is preferably the chloride or sulfate anion, or a mixture thereof.

$M^+$ is preferably an alkali metal (e.g., sodium and potassium), alkaline earth metal (e.g., calcium and barium), lead, zinc or ammonium cation, or a mixture thereof, e.g., sodium and lead. The preferred cations are sodium, ammonium, barium, calcium and zinc with the sodium, ammonium and barium cations being particularly preferred.

Examples of the carboxylate salts of the formula $M^+ A^-$ that are preferred for process variant B are the sodium, potassium, calcium, barium, lead and zinc salts of formic, acetic chloroacetic, propionic, benzoic, phenoxyacetic, maleic, succinic, lactic and tartaric acids. Also preferred is ammonium acetate which, as previously indicated, can be formed in situ (if the solvent system is glacial acetic acid or a mixture of glacial acetic acid and one or more other organic solvents) by the reaction of ammonium bicarbonate with acetic acid. Also preferred is a mixture of two or more of the foregoing salts, e.g., sodium acetate and lead acetate. The two salts can also be added singly in succession to the reaction medium.

When the solvent is glacial acetic acid or a mixture of glacial acetic acid and one or more organic solvents excluding other carboxylic acids, the carboxylate salt of the formula $M^+ A^-$ is almost always an acetate salt.

The preferred way of carrying out process variant B is to use glacial acetic acid as the solvent, an acetate salt of the formula $M^+ A^-$ ($A^-$ being acetate) and an insoluble or sparingly soluble cationic azo, preferably monoazo, dye of the formula $F^+ A_1^-$ wherein $A^-$ is chloride or sulfate, or a mixture thereof.

The concentrated solutions obtained by the process (both variants) of this application are stable and can be added directly to dye baths. They can also be diluted prior to use.

As is self-evident, throughout the specification and claims the charge of the ions (e.g., $M^+$, $A^-$ and $A_1^-$) has been indicated as $+$ or $-$ without regard to the fact that it may be other than $+1$ or $-1$, e.g., $A_1^-$ has a charge of $-2$ if it is the sulfate anion.

In the following Examples, the parts denote parts by weight and the percentages denote percentages by weight. The temperatures are stated in degrees Celsius (centigrade).

EXAMPLE 1

43 parts of the red dye of the formula

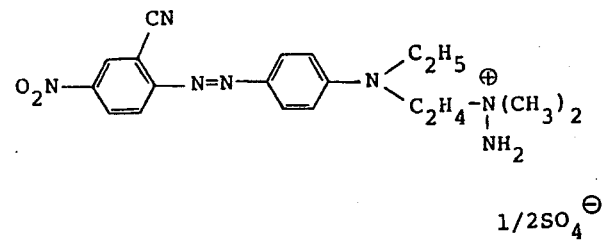

in 180 parts of glacial acetic acid are heated to 80° whereupon the dye dissolves completely. 30 parts of crystallized sodium acetate are added to the 80° solution and the solution is kept at this temperature for 30 minutes. The solution is then allowed to cool. After some time 6.3 parts of a colorless salt (principally sodium sulfate) crystallizes out and is removed by filtration (about 90% of the theoretical quantity based upon sodium sulfate). The filtrate is a solution of the acetate salt of the dye having a dye concentration of 18%. It is a stable solution.

If not sodium acetate is added to the 80° solution, the dye crystallizes out upon cooling.

EXAMPLE 2

53 parts of the yellow cationic dye formed by coupling diazotized 2,6-dichloro-4-N,N-dimethylsulfamoylaniline with 1-(2'-N-ethyl-N-phenylamino)ethyl-1,1-dimethylhydrazinium chloride (as a mixture of sulfate and chloride salts) in 180 parts of glacial acetic acid are heated to 80°. 30 parts of crystallized sodium acetate are then added and the reaction mixture is stirred at 80° for 30 minutes. Stirring is continued as the reaciton mixture is allowed to cool. The precipitate formed is removed by filtration. (Based on sodium chloride, the 5.1 parts of precipitate represents 86% of the theoretical amount.) The filtrate is a solution of the acetate salt of the cationic dye having a dye concentration of 20%. It is a stable solution and is useful for dyeing polyacrylonitrile.

EXAMPLE 3

140 parts of glacial acetic acid are heated to 90° and 22.5 parts of ammonium bicarbonate are added. After forming has ceased, 51.5 parts of the dye of Example 2 are added and the mixture is stirred until cold. 2.5 parts of diatomaceous earth are added and the precipitated salt is removed by filtration. The filtered residue contains about 90% of the theoretical amount of inorganic salt. To the filtrate sufficient glacial acetic acid is added to bring the total weight of the solution to 200 parts. A solution of the acetate salt of the cationic azo dye having a dye concentration of about 25% is obtained. The solution is crystallization stable.

EXAMPLE 4

17.5 parts of the exceedingly sparingly soluble dye of Example 1 are heated to 90° in 73.5 parts of water and 60 parts of glacial acetic acid, and 5 parts of Hyflo filter earth and 7.5 parts of lead acetate are added with stirring. After 30 minutes the reaction mixture was filtered while hot and the filtrate was diluted to 100 parts with 11 parts of water. The residue on the filter was washed separately with 50 parts of water until it was colorless and was subsequently dried in a vacuum. The weight of the residue is 10.9 parts, of which 5.0 parts are Hyflo filter earth and 5.9 parts are lead sulfate. A stable solution of the acetate salt of the cationic azo dye is obtained.

EXAMPLE 5

43 parts of the red dye of Example 1 are stirred for 2 hours at room temperature in 100 parts of water and a solution of 15 parts of barium acetate in 60 parts of glacial acetic acid. A solution having a concentration of 20% which, after optional dilution with water, is suitable for dyeing polyacrylonitrile fibers.

EXAMPLE 6

60 parts of the dye of the formula

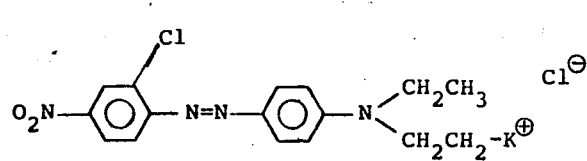

and 25.6 parts of water are stirred together with a mixture consisting of 183 parts of glacial acetic acid, 9 parts of water and 17 parts of lead monoxide. The reaction mixture is then heated to 85°, stirred for half an hour at 85° and, after cooling, the precipitated lead chloride is removed by filtration at room temperature. After addition of 1.3 parts of ammonium sulfate, the filtrate is stirred at room temperature for an additional two hours. The precipitated lead sulfate is removed by filtration, and 24 parts of water are added to the filtrate. A clear, stable, deep red solution of the acetate salt of the cationic dye having a dye concentration of 20% is obtained.

EXAMPLE 7

71.5 parts of a filter cake containing 40.8 parts of the sulfate salt of the cationic dye obtained by coupling diazotized 2-bromo-4,6-dinitroaniline with 1-(2'-N-ethyl-N-3''-methylphenylamino)ethyl-1,1-dimethylhydrazinium chloride in sulfuric acid and 30.7 parts of water are stirred in a mixture of 91.5 parts of glacial acetic acid and 7.2 parts of water at 65°–70°, 7.7 parts of lead oxide are added and the reaction mixture is stirred at the same temperature for 2 hours. Following cooling, 2.5 parts of filter earth are added and the reaction mixture is filtered. The residue is washed with a mixture of 20 parts of glacial acetic acid and 10 parts of water. It contains about 10.2 parts of lead sulfate (98% of the theoretical amount). A clear solution of the acetate salt of the cationic azo dye having a dye concentration of 20% is obtained. It is stable and ready for use.

EXAMPLES 8a–c

25% solutions of the acetate salts of the following cationic azo dyes can be prepared according to the procedures of Example 1:

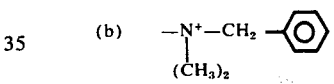

wherein K$^+$ is
a. —N$^+$(CH$_3$)$_3$,

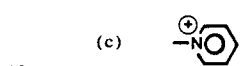

The starting chloride salts are only partially soluble in water and very sparingly soluble in salt-containing water. However, the obtained solutions of the corresponding acetate salts are miscible with salt-free water in all proportions.

EXAMPLE 9

48 parts of the very sparingly soluble dye of the formula

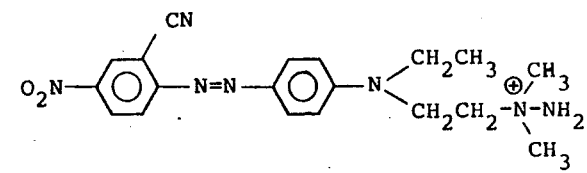

are stirred at 80° in 100 parts of water and a solution consisting of 8.1 parts of zinc oxide in 35 parts of 40% aqueous acetic acid. 10 parts of a 25% aqueous ammonia solution are added to effect complete dissolution of the dye. The reaction mixture is then allowed to cool and the nearly colorless zinc ammonium phosphate precipitate is removed by filtration (17 parts; 95% of the theoretical amount). The filtrate is a solution of the acetate salt of the cationic azo dye having a dye concentration of 25%

EXAMPLE 10

20 parts of the exceedingly sparingly soluble dye of Example 1 are dissolved at 80° in a mixture of 40 parts of water and 20 parts of glacial acetic acid containing 20 parts of lactic acid. 4 parts of chalk (calcium carbonate) are added to the hot solution and the solution is allowed to cool. The nearly colorless calcium sulfate precipitate is then removed by filtration. The filtrate is a solution of the cationic azo dye having a dye concentration of 20%.

If the procedure of this example is repeated except that no chalk is added, 19.5 parts of the original dye precipitate out upon cooling.

EXAMPLE 11

43 parts of the red dye of Example 1 are stirred for 2 hours at room temperature in a solution of 15 parts of barium acetate in 70 parts of glacial acetic acid (prepared by dissolving 12 parts of barium carbonate in 75 parts of glacial acetic acid). When everything has dissolved, the reaction mixture is diluted with water to obtain the desired color strength. The finely divided barium sulfate precipitate is removed from the solution by centrifugation.

What is claimed is:
1. A process for the production of a concentrated liquid dye preparation of a cationic azo dye, said concentrated liquid dye preparation being suitable for direct application to textiles, comprising
a. reacting in a solvent system an insoluble or sparingly soluble cationic azo dye of the formula

$F^+ A_1^-$ with a non-chromophoric carboxylate salt of the formula $M^+ A^-$ to obtain a concentrated solution of a soluble cationic azo dye of the formula $F^+ A^-$ wherein
$F^+$ is the cation of an insoluble or sparingly soluble cationic azo dye,
$A_1^-$ is the anion of an insoluble or sparingly soluble cationic azo dye,
$M^+$ is a non-chromophoric cation, and
$A^-$ is a non-chromophoric carboxylate anion,
with the provisos that
1. the reactants and solvent system are chosen such that $F^+ A^-$ is more soluble in the solvent system than is $F^+ A_1^-$,
2. $F^+ A^-$ is soluble enough to form a concentrated solution in the solvent system,
3. $M^+ A^-$ and $F^+ A_1^-$ are present in amounts sufficient for the preparation of a concentrated solution, and
4. $M^+ A^-$ is soluble or partially soluble in the solvent system, and
b. removing any precipitated salts, whereby a concentrated liquid dye preparation is obtained.

2. A process according to claim 1 wherein the concentrated liquid dye preparation has a dye concentration of 15–50%.

3. A process according to claim 2 wherein the cationic azo dye is a cationic monoazo dye.

4. A process for the preparation of a concentrated solution of a cationic azo dye comprising (a) reacting in a solvent system an insoluble or sparingly soluble cationic azo dye of the formula $F^+ A_1^-$ with a non-chromophoric carboxylate salt of the formula $M^+ A^-$ to obtain a concentrated solution of a soluble cationic dye of the formula
$F^+ A^-$ wherein
$F^+$ is the cation of an insoluble or sparingly soluble cationic azo dye,
$A_1^-$ is the anion of an insoluble or sparingly soluble cationic azo dye,
$M^+$ is a non-chromophoric cation, and
$A^-$ is a non-chromophoric carboxylate anion,
with the provisos that
1. the reactants and solvent system are chosen such that $F^+ A^-$ is more soluble in the solvent system than is $F^+ A_1^-$,
2. $F^+ A^-$ is soluble enough to form a concentrated solution in the solvent system,
3 $M^+ A^-$ and $F^+ A_1^-$ are present in amounts sufficient for the preparation of a concentrated solution, and
4. $M^+ A^-$ is soluble or partially soluble in the solvent system, and
b. removing any precipitated salts.

5. A process according to claim 4 wherein the concentrated solution of the cationic azo dye has a dye concentration of 15–50%

6. A process according to claim 5 wherein
$F^+$ is the cation of an insoluble or sparingly soluble cationic monoazo dye,
$A_1^-$ is chloride, sulfate, methylsulfate, phosphate or perchlorate, or a mixture thereof,
$M^+$ is an ammonium, alkali metal, alkaline earth metal, zinc or lead cation, or a mixture thereof, and
$A^-$ is formate, acetate, chloroacetate, propionate, benzoate, phenoxyacetate, maleate, succinate, lactate or tartarate, or a mixture thereof.

7. A process according to claim 4 wherein the solvent system is water or a mixture of water and at least one organic solvent.

8. A process according to claim 7 wherein the solvent system is water.

9. A process according to claim 8 wherein the concentrated solution of the cationic azo dye has a dye concentration of 15–50%.

10. A process according to claim 9 wherein $F^+$ is the cation of an insoluble or sparingly soluble cationic monoazo dye, $A_1^-$ is chloride, sulfate, methylsulfate, phosphate or perchlorate, or a mixture thereof, $M^+$ is a barium, lead, calcium or zinc cation, or a mixture thereof, and $A^-$ is formate, acetate, chloroacetate, propionate, benzoate, phenoxyacetate, maleate, succinate, lactate or tartarate.

11. A process according to claim 10 wherein $A_1^-$ is chloride, sulfate, methylsulfate, phosphate or perchlorate, and $M^+$ is a barium or lead cation, or a mixture thereof.

12. A process according to claim 8 wherein the solvent system is a mixture of water and at least one organic solvent.

13. A process according to claim 12 wherein at least 10% by weight of the solvent system is water.

14. A process according to claim 13 wherein the concentrated solution of the cationic dye has a dye concentration of 15–50%.

15. A process according to claim 14 wherein $F^+$ is the cation of an insoluble or sparingly soluble cationic monoazo dye, $A_1^-$ is chloride, sulfate, methylsulfate, phosphate or perchlorate, or a mixture thereof, $M^+$ is a barium, lead, calcium or zinc cation, or a mixture thereof, and $A^-$ is formate, acetate, chloroacetate, propionate, benzoate, phenoxyacetate, maleate, succinate, lactate or tartarate.

16. A process according to claim 15 wherein $A_1^-$ is chloride, sulfate, methylsulfate, phosphate or perchlorate, and $M^+$ is a barium or lead cation, or a mixture thereof.

17. A process according to claim 15 wherein the solvent system is a mixture of water and acetic acid, and $A^-$ is acetate.

18. A process according to claim 17 wherein $M^+ A^-$ is barium acetate or lead acetate, or a mixture thereof.

19. A process according to claim 4 wherein the solvent system is an organic solvent or a mixture of organic solvents.

20. A process according to claim 19 wherein the solvent system is benzyl alcohol, glycol, ethyl glycol, methyl ethyl ketone, dimethylformamide, tetrahydrofuran, dimethyl sulfoxide, sulfolane, propane sulfone or glacial acetic acid, or a mixture thereof.

21. A process according to claim 19 wherein the concentrated solution of the cationic azo dye has a dye concentration of 15–50%.

22. A process according to claim 21 wherein $F^+$ is the cation of an insoluble or sparingly soluble cationic monoazo dye, $A_1^-$ is chloride or sulfate, or a mixture thereof, $M^+$ is an alkali metal, alkaline earth metal, lead, zinc or ammonium cation, or a mixture thereof, and $A^-$ is formate, acetate, chloroacetate, propionate, benzoate, phenoxyacetate, maleate, succinate, lactate or tartarate.

23. A process according to claim 22 wherein $M^+$ is a sodium, potassium, calcium, barium, lead, zinc or ammonium cation, or a mixture thereof.

24. A process according to claim 23 wherein the solvent is glacial acetic acid, and $A^-$ is acetate.

25. A process according to claim 22 wherein the solvent is glacial acetic acid, $A_1^-$ is chloride or sulfate, $M^+$ is a sodium, potassium, calcium, barium, lead, zinc or ammonium cation, and $A^-$ is acetate.

\* \* \* \* \*